(12) United States Patent
Itou et al.

(10) Patent No.: US 12,215,723 B2
(45) Date of Patent: Feb. 4, 2025

(54) FLUID PRESSURE CYLINDER

(71) Applicant: KYB Corporation, Tokyo (JP)

(72) Inventors: Tatsuya Itou, Nagano (JP); Nobuyuki Kobayashi, Nagano (JP); Hirotaka Kobayashi, Nagano (JP)

(73) Assignee: KYB CORPORATION, Tokyo (JP)

( * ) Notice: Subject to any disclaimer, the term of this patent is extended or adjusted under 35 U.S.C. 154(b) by 0 days.

(21) Appl. No.: 18/292,429

(22) PCT Filed: Apr. 25, 2022

(86) PCT No.: PCT/JP2022/018718
§ 371 (c)(1),
(2) Date: Jan. 26, 2024

(87) PCT Pub. No.: WO2023/007890
PCT Pub. Date: Feb. 2, 2023

(65) Prior Publication Data
US 2024/0218889 A1 Jul. 4, 2024

(30) Foreign Application Priority Data
Jul. 28, 2021 (JP) ................. 2021-123341

(51) Int. Cl.
*F15B 19/00* (2006.01)
*F15B 15/14* (2006.01)
(Continued)

(52) U.S. Cl.
CPC ........ *F15B 19/005* (2013.01); *F15B 15/1452* (2013.01); *F15B 15/1457* (2013.01);
(Continued)

(58) Field of Classification Search
CPC .............. F15B 15/1447; F15B 15/1452; F15B 15/1457; F15B 15/149; F15B 19/005; F15B 20/005
(Continued)

(56) References Cited

U.S. PATENT DOCUMENTS 5,882,235 A * 3/1999 Nakamura ............. B63H 20/10
440/61 R
8,561,522 B2 * 10/2013 Funato ................ F15B 15/1447
92/255

(Continued)

FOREIGN PATENT DOCUMENTS

JP S63-97491 A 4/1988
JP 2004-263713 A 9/2004
(Continued)

*Primary Examiner* — Michael Leslie
(74) *Attorney, Agent, or Firm* — Rabin & Berdo, P.C.

(57) ABSTRACT

A hydraulic cylinder includes: a cylinder tube; a piston rod; a piston member; a rod inner passage provided within the piston rod, a rod inner passage being configured such that a first opening portion opens at an outer circumferential surface of the piston rod in the cylinder tube, and such that a second opening portion opens outside the cylinder tube; and a sensor part provided outside the cylinder tube, the sensor part being configured to detect that the working fluid is guided to the rod inner passage, the piston member is connected to the piston rod in a state in which one-side end surface is in contact with an annular step portion so as to block the first opening portion of the rod inner passage, the annular step portion being provided on the outer circumferential surface of the piston rod, and the sensor part is configured to detect that the working fluid is guided to the rod inner passage from a rod side chamber and a counter rod side chamber through a gap between the step portion and the piston member.

4 Claims, 3 Drawing Sheets

(51) Int. Cl.
 *F15B 20/00* (2006.01)
 *F16J 1/12* (2006.01)
(52) U.S. Cl.
 CPC ............ *F15B 15/149* (2013.01); *F15B 20/00* (2013.01); *F16J 1/12* (2013.01)
(58) Field of Classification Search
 USPC .......................................................... 92/110
 See application file for complete search history.

(56) References Cited

U.S. PATENT DOCUMENTS

| | | | |
|---|---|---|---|
| 11,225,985 B2 * | 1/2022 | Takahashi | ............. F15B 19/005 |
| 11,339,810 B2 * | 5/2022 | Kikuchi | ................ G01M 3/002 |
| 11,466,707 B2 * | 10/2022 | Takahashi | ........... G01M 3/3272 |
| 11,499,574 B2 * | 11/2022 | Takahashi | ............. F16J 15/004 |
| 2006/0140781 A1 | 6/2006 | Nakata et al. | |
| 2011/0067564 A1 | 3/2011 | Funato et al. | |
| 2020/0362888 A1 | 11/2020 | Leiber et al. | |

FOREIGN PATENT DOCUMENTS

| | | | |
|---|---|---|---|
| JP | 2007-092785 A | 4/2007 | |
| JP | 2010-164067 A | 7/2010 | |

* cited by examiner

FLUID PRESSURE CYLINDER

TECHNICAL FIELD

The present invention relates to a fluid pressure cylinder.

BACKGROUND ART

JP2004-263713A discloses a fluid pressure cylinder having a cylinder main body into which a piston is assembled reciprocatably and a piston rod that is attached to the piston so as to project outwards from an end portion the cylinder main body. The piston is attached to the piston rod by being threadedly coupled to an end portion of the piston rod.

SUMMARY OF INVENTION

In the fluid pressure cylinder as described in JP2004-263713A, if an excessive load acts on the piston, there is a risk in that the piston is loosened with respect to the piston rod. As the loosening of the piston with respect to the piston rod progresses, a malfunction of the fluid pressure cylinder is caused. In the fluid pressure cylinder described in JP2004-263713A, it is difficult for an operator to notice the loosening of the piston until the malfunction of the fluid pressure cylinder is actually caused.

An object of the present invention is to prevent occurrence of a malfunction of a fluid pressure cylinder due to loosening of a piston member.

According to one aspect of the present invention, a fluid pressure cylinder includes: a cylinder tube; a piston rod inserted within the cylinder tube reciprocatably; a piston member connected to a tip end of the piston rod, the piston member being configured to define a fluid pressure chamber in the cylinder tube; a rod inner passage provided within the piston rod, the rod inner passage being configured such that a first opening portion opens at an outer circumferential surface of the piston rod in the cylinder tube, and such that a second opening portion opens outside the cylinder tube; and a sensor part provided outside the cylinder tube, the sensor part being configured to detect that working fluid is guided to the rod inner passage, the piston member is connected to the piston rod in a state in which one-side end surface of the piston member is in contact with an annular step portion so as to block the first opening portion of the rod inner passage, the annular step portion being provided on the outer circumferential surface of the piston rod, and the sensor part is configured to detect that the working fluid is guided to the rod inner passage from the fluid pressure chamber through a gap between the step portion and the piston member.

DESCRIPTION OF EMBODIMENTS

Embodiments of the present invention will be described below with reference to the drawings.

A fluid pressure cylinder according to an embodiment of the present invention will be described with reference to FIG. 1. In the following, a case in which the fluid pressure cylinder is a hydraulic cylinder 100 in which working oil is used as working fluid will be described.

The hydraulic cylinder 100 is used as an actuator installed on construction machineries and industrial machineries. For example, the hydraulic cylinder 100 is used as an actuator for driving a boom, an arm, a bucket, and so forth that are installed on a hydraulic shovel.

Figure 1:
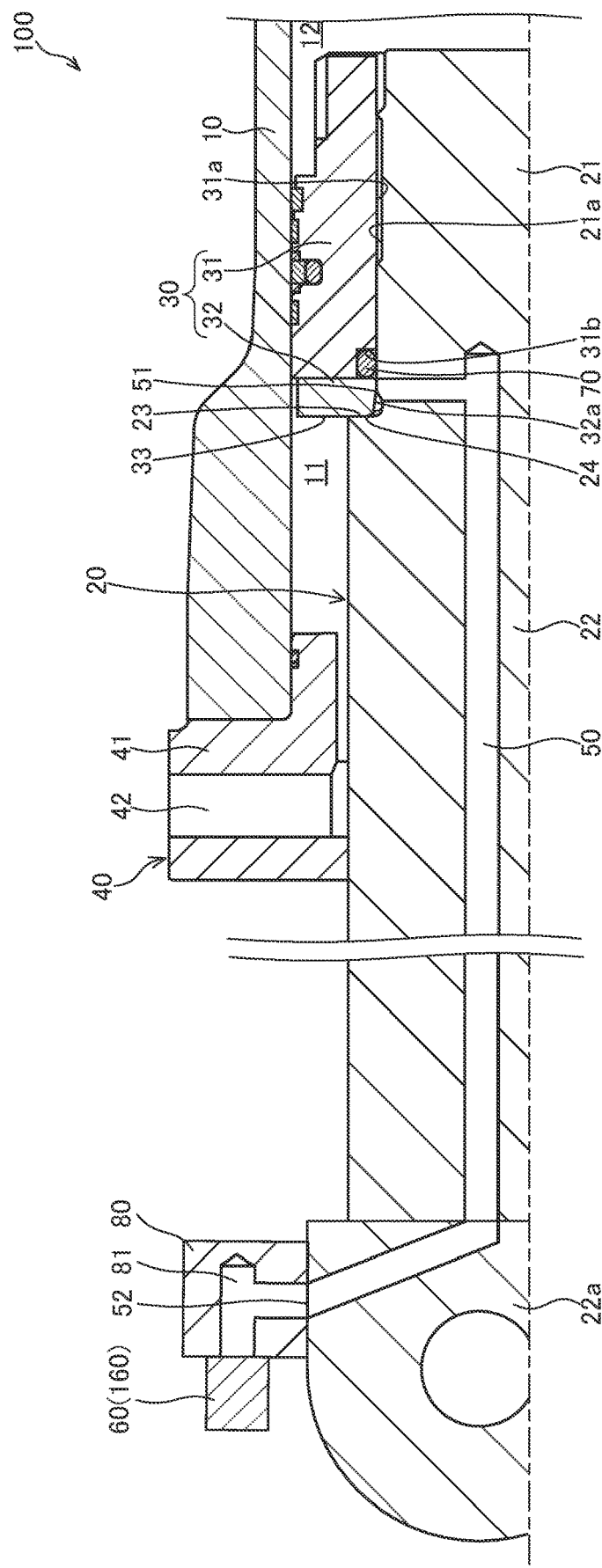
FIG. 1 is a partial sectional view of a fluid pressure cylinder according to an embodiment of the present invention.

As shown in FIG. 1, the hydraulic cylinder 100 includes: a cylindrical cylinder tube 10; a piston rod 20 that is inserted within the cylinder tube 10 reciprocatably; a piston member 30 that is connected to a tip end of the piston rod 20 and that defines a rod side chamber 11 and a counter rod side chamber 12 each serving as a fluid pressure chamber in the cylinder tube 10; and a cylinder head 40 that closes an opening end of the cylinder tube 10. The hydraulic cylinder 100 is extended and contracted in the axial direction as the working oil is supplied from a hydraulic pressure source to one of the rod side chamber 11 and the counter rod side chamber 12 and the working oil is discharged from the other to a tank. As the working oil, instead of using oil, the working fluid, such as an aqueous alternative fluid, etc., for example, may also be used.

The piston rod 20 has a small-diameter portion 21 that is formed on the tip end side thereof and to which the piston member 30 is connected and a large-diameter portion 22 that has a larger outer diameter than the small-diameter portion 21 and that is slidably supported by the cylinder head 40. A step portion 23 that is an annular surface perpendicular to the axial direction of the piston rod 20 is provided between the small-diameter portion 21 and the large-diameter portion 22. In addition, the piston rod 20 has a curved surface portion 24 that is provided at the boundary portion between the small-diameter portion 21 and the step portion 23 so as to be recessed in a ring shape. The curved surface portion 24 is provided by being recessed radially inward of the small-diameter portion 21. By providing the curved surface portion 24, stress concentration caused at the boundary portion between the small-diameter portion 21 and the step portion 23 is reduced. An external threaded portion 21a that is threadedly coupled with the piston member 30 is provided on a part of the small-diameter portion 21. In addition, the large-diameter portion 22 extends out from the opening end of the cylinder tube 10, and on its end portion, an attachment portion 22a for attachment of other equipment is provided. The attachment portion 22a is, for example, attached to the end portion of the large-diameter portion 22 by welding. Note that the attachment portion 22a also forms a part of the piston rod 20.

In the piston rod 20, a rod inner passage 50 is provided so as to extend in the axial direction. In the rod inner passage 50, a first opening portion 51 opens at an outer circumferential surface of the small-diameter portion 21 in the cylinder tube 10, and a second opening portion 52 opens outside the cylinder tube 10. Specifically, the opening portion 51 is provided in the vicinity of the step portion 23 between the step portion 23 and the external threaded portion 21a. In addition, the opening portion 52 is provided on an outer circumferential surface of the attachment portion 22a. Thus, the opening portion 52 is positioned outside the cylinder tube 10 even when the hydraulic cylinder 100 is in its most contracted state.

The rod inner passage 50 is machined before the attachment portion 22a is attached to an end portion of the piston rod 20. Specifically, the rod inner passage 50 is formed by performing cutting from the end portion of the piston rod 20 in the axial direction of the piston rod 20 and by performing the cutting from the outer circumferential surface of the attachment portion 22*a* towards the center of an attachment surface to the piston rod 20.

The hydraulic cylinder 100 includes a pressure sensor 60 serving as a sensor part that is provided outside the cylinder tube 10 and that detects that the working oil is guided to the rod inner passage 50. The pressure sensor 60 is attached to the attachment portion 22*a* via a joint 80. The joint 80 is formed with a passage 81 that communicates with the rod inner passage 50 and guides the working oil from the rod inner passage 50 to the pressure sensor 60. The pressure sensor 60 detects that the working oil is guided from the opening portion 51 to the rod inner passage 50 and wirelessly transmits obtained detection information to an external device (not shown) as an electrical signal.

The piston member 30 has a piston main body portion 31 that slides along an inner circumferential surface of the cylinder tube 10 and a ring member 32 that is provided between the piston main body portion 31 and the step portion 23 of the piston rod 20. The piston main body portion 31 and the ring member 32 are formed of the same material. The ring member 32 has a smaller outer diameter than the piston main body portion 31. The ring member 32 is in surface contact with the piston main body portion 31, and so, the working oil is not guided between the piston main body portion 31 and the ring member 32. An internal threaded portion 31*a* that is threadedly coupled with the external threaded portion 21*a* of the piston rod 20 is provided on a part of an inner circumferential surface of the piston main body portion 31. The internal threaded portion 31*a* is threaded into the external threaded portion 21*a* of the piston rod 20 until the ring member 32 comes into contact with the step portion 23. As a result, the piston member 30 is connected to the piston rod 20 in a state in which a one-side end surface 33 is in contact with the step portion 23 of the piston rod 20. As described above, the opening portion 51 of the rod inner passage 50 is provided between the step portion 23 and the external threaded portion 21*a*. Therefore, in a state in which the piston member 30 is connected to the piston rod 20, the ring member 32 of the piston member 30 is in contact with the step portion 23 and covers the opening portion 51 of the rod inner passage 50, and thereby, the flow of the working oil from the rod side chamber 11 to the rod inner passage 50 is blocked. As described above, the ring member 32 blocks the opening portion 51.

In addition, the ring member 32 has a tapered portion 32*a* that is provided on an inner circumferential surface of the ring member 32 so as to oppose to the curved surface portion 24 of the piston rod 20, and the inner diameter of the ring member 32 is increased towards the end surface 33. The tapered portion 32*a* is provided annularly on the inner circumferential surface of the ring member 32 so as to extend to the end surface 33. By providing the tapered portion 32*a*, the contact between the ring member 32 and the curved surface portion 24 of the piston rod 20 is prevented. As a result, the contact between the piston member 30 and the step portion 23 of the piston rod 20 is ensured.

The hydraulic cylinder 100 includes an annular O-ring 70 serving as a seal member that is provided between the piston member 30 and the piston rod 20 by being compressed to seal a gap between them. The inner circumferential surface of the piston main body portion 31 is formed with an annular groove 31*b* that accommodates the O-ring 70. The annular groove 31*b* is formed so as to open at an end surface of the piston main body portion 31 that opposes to the step portion 23 via the ring member 32. In other words, the annular groove 31*b* is formed so as to open at the end surface of the piston main body portion 31 that comes into contact with the ring member 32. Therefore, the O-ring 70 can be accommodated into the annular groove 31*b* at the time of assembly with ease.

The cylinder head 40 is a substantially cylindrical member through which the piston rod 20 is inserted. The cylinder head 40 has a flange portion 41, and the flange portion 41 is screw fastened to an end portion of the cylinder tube 10 by using a screw (not shown), etc. The flange portion 41 may also be fastened to the end portion of the cylinder tube 10 by using a bolt etc. The cylinder head 40 is provided with a supply and discharge port 42 that supplies and discharges the working oil to and from the rod side chamber 11. A first end of the supply and discharge port 42 faces an outer circumferential surface of the piston rod 20 and communicates with the rod side chamber 11 through an annular gap between the outer circumferential surface of the piston rod 20 and an inner circumferential surface of the cylinder head 40. A second end of the supply and discharge port 42 opens at an outer circumferential surface of the cylinder head 40. A hydraulic piping (not shown) is connected to the second end of the supply and discharge port 42, and the hydraulic piping is connected to the hydraulic pressure source or a tank through a switching valve.

In the above, in the hydraulic cylinder 100, when the excessive load acts on the piston member 30, there is a risk in that the piston member 30 is loosened with respect to the piston rod 20 (hereinafter, simply referred to as "the loosening of the piston member 30"). If the loosening of the piston member 30 progresses, the malfunction of the hydraulic cylinder 100 is caused. Specifically, when a load exceeding the axial force in the connection between the piston member 30 and the piston rod 20 acts on the piston member 30, the piston rod 20 is stretched in the axial direction while the threaded coupling between the internal threaded portion 31*a* of the piston member 30 and the external threaded portion 21*a* of the piston rod 20 is maintained. If the piston rod 20 is stretched in the axial direction, the step portion 23 of the piston rod 20, which receives the axial force in the connection between the piston member 30 and the piston rod 20, is separated away from the end surface 33 of the piston member 30. Thus, the axial force acting on the piston member 30 is lowered, and the threaded coupling between the internal threaded portion 31*a* of the piston member 30 and the external threaded portion 21*a* of the piston rod 20 is loosened. With general hydraulic cylinders, it is difficult for an operator to notice the loosening of the piston member until the loosening of the piston member progresses and the malfunction of the hydraulic cylinder is caused thereby.

In contrast, in the hydraulic cylinder 100, before the hydraulic cylinder 100 becomes dysfunctional, it is possible to detect the loosening of the piston member 30 by the pressure sensor 60 at an earlier stage. In the following, the detection of the loosening of the piston member 30 by the pressure sensor 60 will be described in detail with reference to FIGS. 1 and 2.

In the state in which the piston member 30 is connected to the piston rod 20, as described above, the ring member 32 is in contact with the step portion 23 of the piston rod 20, and the flow of the working oil through a gap between them from the rod side chamber 11 to the rod inner passage 50 is blocked. In addition, by forming the threaded coupling between the internal threaded portion 31*a* of the piston main body portion 31 and the external threaded portion 21*a* of the piston rod 20 and by providing the O-ring 70, the flow of the working oil from the counter rod side chamber 12 to the rod inner passage 50 through the gap between an inner circumferential surface of the piston member 30 and the outer circumferential surface of the small-diameter portion 21 of the piston rod 20 is also blocked. Furthermore, the flow of the working oil from the rod side chamber 11 to the rod inner passage 50 through the gap between the piston main body portion 31 and the ring member 32 is also blocked by the O-ring 70. Thus, the working oil is not guided to the rod inner passage 50 from the rod side chamber 11 and the counter rod side chamber 12.

Figure 2:
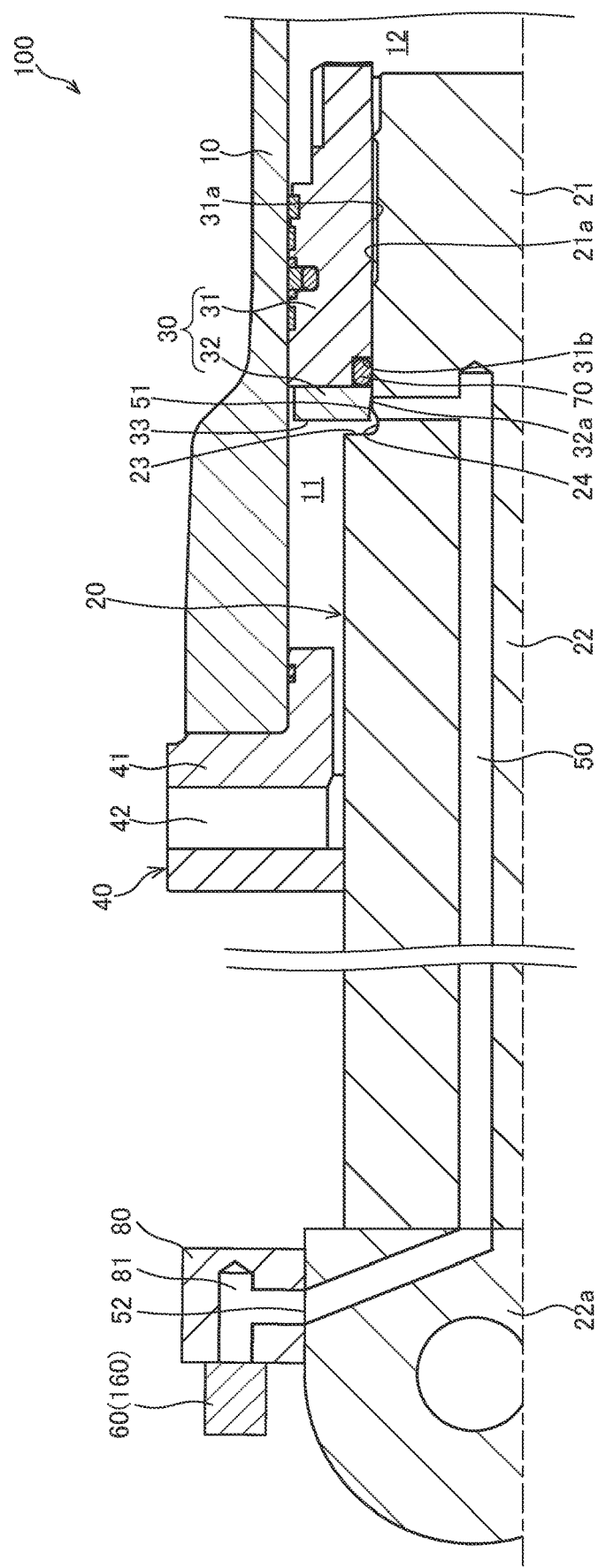
FIG. 2 is a partial sectional view of the fluid pressure cylinder according to the embodiment of the present invention and shows a state in which a piston member is loosened with respect to a piston rod.

As shown in FIG. 2, when the piston member 30 is loosened with respect to the piston rod 20, the ring member 32 and the step portion 23 are separated away from each other, and a gap is formed between them. As a result, the working oil is guided from the rod side chamber 11 to the rod inner passage 50 through the gap between the ring member 32 and the step portion 23. The pressure sensor 60 then detects that the working oil has been guided to the rod inner passage 50. Therefore, it is possible to detect the loosening of the piston member 30 by the pressure sensor 60. Thus, it is possible to detect the loosening of the piston member 30 at an early initial stage of the onset of the loosening of the piston member 30, and so, it is possible to prevent the occurrence of the malfunction of the hydraulic cylinder 100 due to the loosening of the piston member 30.

In addition, in the hydraulic cylinder 100, the O-ring 70 is provided on the opposite side of the step portion 23 of the piston rod 20 with the opening portion 51 of the rod inner passage 50 as a boundary. Thus, the communication between the rod side chamber 11 and the counter rod side chamber 12 through the gap between the inner circumferential surface of the piston member 30 and the outer circumferential surface of the small-diameter portion 21 of the piston rod 20 is blocked by the O-ring 70. As a result, when the gap is formed between the ring member 32 of the piston member 30 and the step portion 23, the working oil that has entered the gap from the rod side chamber 11 is guided to the rod inner passage 50, but not to the counter rod side chamber 12. Thus, the detection accuracy of the loosening of the piston member 30 by the pressure sensor 60 is improved. Although the detection accuracy of the loosening of the piston member 30 is lowered, the annular groove 31b and the O-ring 70 are not necessarily required to be provided and are not essential configurations of the present invention.

Furthermore, in the hydraulic cylinder 100, the annular groove 31b of the piston main body portion 31 of the piston member 30 is formed so as to open to the end surface opposing to the step portion 23 of the piston rod 20. Therefore, if a configuration in which the end surface of the piston main body portion 31 comes into contact with the step portion 23 of the piston rod 20 is employed, because the contact area between the piston member 30 and the step portion 23 becomes smaller, a sealing performance between them is deteriorated. However, in the hydraulic cylinder 100, the ring member 32 is provided between the piston main body portion 31 and the step portion 23 of the piston rod 20, and the ring member 32 comes into contact with the step portion 23. Therefore, the contact area between the piston member 30 and the step portion 23 is secured, and it is possible to further block the flow of the working oil to the rod inner passage 50 through the gap between them. Thus, the detection accuracy of the loosening of the piston member 30 by the pressure sensor 60 is improved.

Furthermore, the contact surface between the piston member 30 and the step portion 23 of the piston rod 20 is a surface that receives the axial force exerted by the screw fastening when the piston member 30 is connected to the piston rod 20. In the hydraulic cylinder 100, because the contact area between the piston member 30 and the step portion 23 is secured by the ring member 32, it is possible to ensure a fastening force of the piston member 30 to the piston rod 20.

In the hydraulic cylinder 100, as described above, the pressure sensor 60 detects that the working oil has been guided from the rod side chamber 11 to the rod inner passage 50, and the detection information is transmitted wirelessly to the external device (not shown) as the electrical signal. Thus, even in a case in which the construction machineries and industrial machineries, on which the hydraulic cylinder 100 is installed, are operated remotely by the operator using a terminal, etc., because, for example, the detection information of the loosening of the piston member 30 from the pressure sensor 60 is transmitted to the terminal, etc., the operator can recognize the loosening of the piston member 30. The detection information may be transmitted to the external device by wire.

According to the embodiment mentioned above, the operational advantages described below are afforded.

In the hydraulic cylinder 100, when the piston member 30 is loosened with respect to the piston rod 20, the working oil is guided from the rod side chamber 11 to the rod inner passage 50 through the gap between the ring member 32 and the step portion 23, and this is detected by the pressure sensor 60. Therefore, it is possible to detect the loosening of the piston member 30 by the pressure sensor 60, and so, it is possible to prevent the occurrence of the malfunction of the hydraulic cylinder 100 due to the loosening of the piston member 30.

In addition, in the hydraulic cylinder 100, the communication between the rod side chamber 11 and the counter rod side chamber 12 through the gap between the inner circumferential surface of the piston member 30 and the outer circumferential surface of the small-diameter portion 21 of the piston rod 20 is blocked by the O-ring 70. As a result, when the piston member 30 is loosened and a gap is formed between the ring member 32 of the piston member 30 and the step portion 23, the working oil that has entered the gap is guided to the rod inner passage 50. Thus, the detection accuracy of the loosening of the piston member 30 by the pressure sensor 60 is improved.

In addition, in the hydraulic cylinder 100, because the ring member 32 comes into contact with the step portion 23, the contact area between the piston member 30 and the step portion 23 is secured. Therefore, in a state in which there is no gap between the piston member 30 and the step portion 23 is achieved, it is possible to block the flow of the working oil to the rod inner passage 50 through between the piston member 30 and the step portion 23. Thus, the detection accuracy of the loosening of the piston member 30 by the pressure sensor 60 is improved.

In addition, in the hydraulic cylinder 100, even in a case in which the construction machineries and industrial machineries, on which the hydraulic cylinder 100 is installed, are operated remotely by the operator using the terminal, etc., because, for example, the detection information of the loosening of the piston member 30 from the pressure sensor 60 is transmitted to the terminal, etc., the operator can recognize the loosening of the piston member 30.

Next, modifications of the above-mentioned embodiment will be described. The following modifications also fall within the scope of the present invention, and it is also possible to combine the configurations shown in the modifications with the configurations described in the above embodiment, or to combine the configurations described in the following different modifications.

<First Modification>

In the above-mentioned embodiment, a description has been given of the embodiment in which the sensor part that detects that the working oil is guided to the rod inner passage 50 is the pressure sensor 60. The present invention is not limited thereto, and the sensor part may be a sensor 160 such as an image sensor, a liquid level sensor, and so forth. Specifically, a member that undergoes color change by reacting with the working oil, a member that undergoes change in shape by a reaction with the working oil, a hydraulic pressure, and so forth, or a container that stores the working oil may be provided so as to face the opening portion 52 of the rod inner passage 50, and the sensor 160 may observe the color change, the change in the shape, the level of the working oil in the container for the above-described member, and thereby, the sensor 160 may detect that a the working oil has been guided to the rod inner passage 50. In such configurations, it is possible to detect that the working oil has been guided to the rod inner passage 50 by the sensor 160, such as the image sensor, the liquid level sensor, and so forth other than the pressure sensor. Instead of providing the sensor 160, the loosening of the piston member 30 may be recognized by the operator by the visual observation of the color change, the change in the shape, or the level of the working oil in the container for the above-described member. In such a case, the member and the container itself provided so as to face the opening portion 52 of the rod inner passage 50 functions as the sensor part.

<Second Modification>

Figure 3:
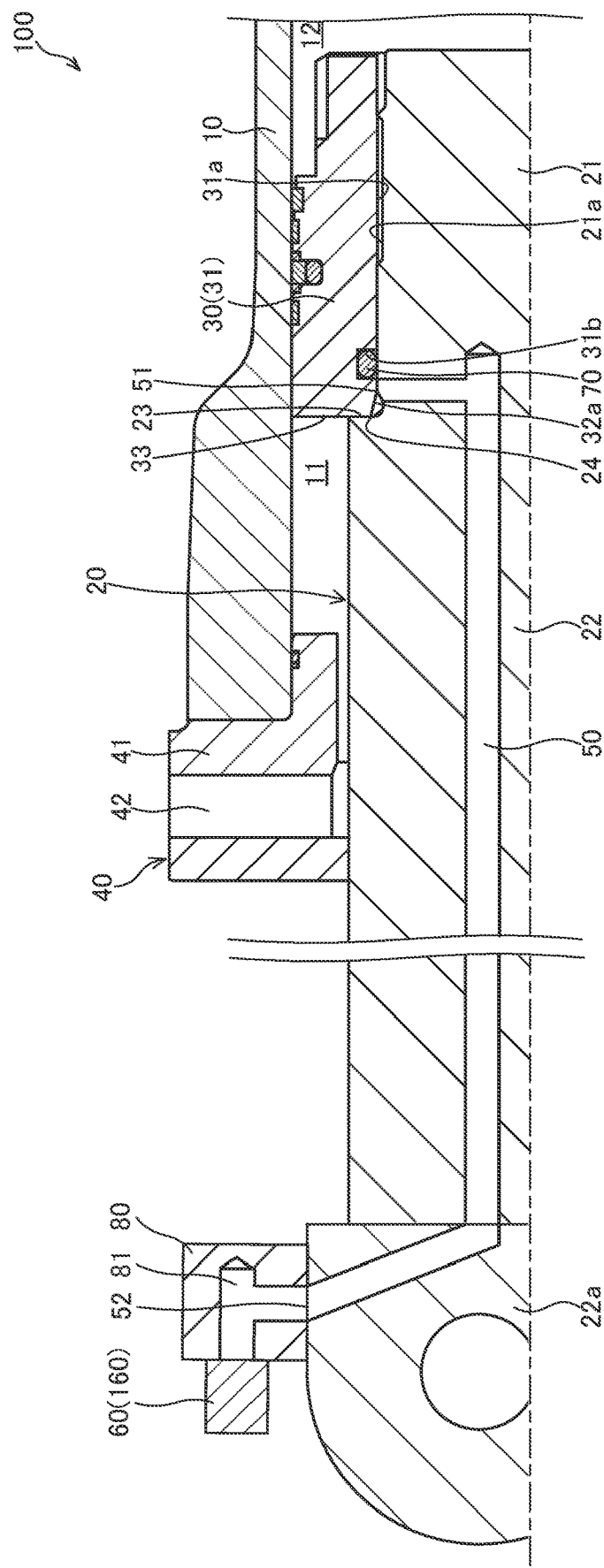
FIG. 3 is a partial sectional view of the fluid pressure cylinder according to a second modification of the embodiment of the present invention.

In the above-mentioned embodiment, the ring member 32 is provided between the piston main body portion 31 and the step portion 23 of the piston rod 20, and the ring member 32 comes into contact with the step portion 23 to block the flow of the working oil from the rod side chamber 11 to the rod inner passage 50 through between the ring member 32 and the step portion 23. The present invention is not limited thereto, and as shown in FIG. 3, the ring member 32 may not be provided, and the piston member 30 may be configured of the piston main body portion 31 only. Even with this configuration, similarly to the above-mentioned embodiment, it is possible to prevent the occurrence of the malfunction of the hydraulic cylinder 100 due to the loosening of the piston member 30. Also in this embodiment, similarly to the above-mentioned embodiment, the O-ring 70 is provided on the opposite side of the step portion 23 of the piston rod 20 with the opening portion 51 of the rod inner passage 50 as a boundary. However, the annular groove 31b accommodating the O-ring 70 is not formed so as to open at the end surface of the piston main body portion 31. Therefore, it is difficult to accommodate the O-ring 70 in the annular groove 31b. In contrast, in the above-mentioned embodiment, because the ring member 32 is provided and the annular groove 31b opens at the end surface of the piston main body portion 31, it is possible to accommodate the O-ring 70 in the annular groove 31b with ease.

The configurations, operations, and effects of the embodiments of the present invention will be collectively described below.

The hydraulic cylinder 100 serving as the fluid pressure cylinder includes: the cylinder tube 10; the piston rod 20 inserted within the cylinder tube 10 reciprocatably; the piston member 30 connected to a tip end of the piston rod 20, the piston member 30 being configured to define the rod side chamber 11 and the counter rod side chamber 12 each serving as the fluid pressure chamber in the cylinder tube 10; the rod inner passage 50 provided within the piston rod 20, the rod inner passage 50 being configured such that the first opening portion 51 opens at the outer circumferential surface of the piston rod 20 in the cylinder tube 10, and such that the second opening portion 52 opens outside the cylinder tube 10; and the sensor part 60, 160 provided outside the cylinder tube 10, the sensor part 60, 160 being configured to detect that the working fluid is guided to the rod inner passage 50, wherein the piston member 30 is connected to the piston rod 20 in a state in which the one-side end surface 33 is in contact with the annular step portion 23 so as to block the first opening portion 51 of the rod inner passage 50, the annular step portion 23 being provided on the outer circumferential surface of the piston rod 20, and the sensor part 60, 160 is configured to detect that the working fluid is guided to the rod inner passage 50 from the rod side chamber 11 and the counter rod side chamber 12 through a gap between the step portion 23 and the piston member 30.

With such a configuration, in a state in which the piston member 30 is connected to the piston rod 20, the one-side end surface 33 of the piston member 30 is in contact with the step portion 23 of the piston rod 20 such that the flow of the working fluid from the rod side chamber 11 and the counter rod side chamber 12 to the rod inner passage 50 is blocked. When the piston member 30 is loosened with respect to the piston rod 20, the working fluid is guided to the rod inner passage 50 through a gap formed between the one-side end surface 33 of the piston member 30 and the step portion 23 of the piston rod 20, and the occurrence of this event is detected by the sensor part 60, 160. Therefore, it is possible to detect the loosening of the piston member 30 with respect to the piston rod 20 by the sensor part 60, 160.

In addition, the hydraulic cylinder 100 further includes the O-ring 70 serving as the annular seal member provided between the piston member 30 and the piston rod 20 by being compressed, wherein the O-ring 70 is provided on the opposite side of the step portion 23 with the first opening portion 51 of the rod inner passage 50 as the boundary.

With such a configuration, the communication between the rod side chamber 11 and the counter rod side chamber 12 through a gap between the piston member 30 and the piston rod 20 is blocked by the O-ring 70. With such a configuration, when the piston member 30 is loosened with respect to the piston rod 20 and a gap is formed between the piston member 30 and the step portion 23 of the piston rod 20, the working fluid that has entered the gap is easily guided to the rod inner passage 50. Thus, the detection accuracy of the loosening of the piston member 30 by the sensor part 60, 160 is improved.

In addition, the piston member 30 has: the piston main body portion 31 configured to slide along the inner circumferential surface of the cylinder tube 10; and the ring member 32 provided between the piston main body portion 31 and the step portion 23 of the piston rod 20, the ring member 32 being configured to block the first opening portion 51 of the rod inner passage 50, and the piston main body portion 31 has the annular groove 31b formed in the inner circumferential surface of the piston main body portion 31, the annular groove 31b being formed so as to open at the end surface of the piston main body portion 31 opposing to the step portion 23 of the piston rod 20 via the ring member 32, and the annular groove 31b being configured to accommodate the O-ring 70.

With such a configuration, the annular groove 31b that accommodates the O-ring 70 is formed so as to open at the end surface of the piston main body portion 31 opposing to the step portion 23 of the piston rod 20. However, the ring member 32 is provided between the piston main body portion 31 and the step portion 23 of the piston rod 20, and the ring member 32 comes into contact with the step portion 23, and therefore, the contact area between the piston member 30 and the step portion 23 of the piston rod 20 is secured.

In addition, the piston rod 20 has the curved surface portion 24 provided at the boundary portion between the small-diameter portion 21 formed towards the tip end with respect to the step portion 23 and the step portion 23 of the small-diameter portion 21, the curved surface portion 24 being recessed in a ring shape, and the piston member 30 has the tapered portion 32a provided on the inner circumferential surface of the piston member 30 so as to face the curved surface portion 24, the tapered portion 32a being formed such that the inner diameter is increased towards the one-side end surface 33.

With such a configuration, the stress concentration caused at the boundary portion between the small-diameter portion 21 and the step portion 23 is suppressed by the curved surface portion 24 of the piston rod 20. In addition, by providing the tapered portion 32a of the piston member 30, the contact between the piston member 30 and the curved surface portion 24 of the piston rod 20 is prevented, and therefore, the contact between the piston member 30 and the step portion 23 of the piston rod 20 is ensured.

Embodiments of the present invention were described above, but the above embodiments are merely examples of applications of the present invention, and the technical scope of the present invention is not limited to the specific constitutions of the above embodiments.

With respect to the above description, the contents of application No. 2021-123341, with a filing date of Jul. 28, 2021 in Japan, are incorporated herein by reference.

The invention claimed is:
1. A fluid pressure cylinder comprising:
  a cylinder tube;
  a piston rod inserted within the cylinder tube reciprocatably;
  a piston member connected to a tip end of the piston rod, the piston member being configured to define a fluid pressure chamber in the cylinder tube;
  a rod inner passage provided within the piston rod, the rod inner passage being configured such that a first opening portion opens at an outer circumferential surface of the piston rod in the cylinder tube, and such that a second opening portion opens outside the cylinder tube; and
  a sensor part provided outside the cylinder tube, the sensor part being configured to detect that working fluid is guided to the rod inner passage, wherein
  the piston member is connected to the piston rod in a state in which one-side end surface of the piston member is in contact with an annular step portion so as to block the first opening portion of the rod inner passage, the annular step portion being provided on the outer circumferential surface of the piston rod, and
  the sensor part is configured to detect that the working fluid is guided to the rod inner passage from the fluid pressure chamber through a gap between the step portion and the piston member.

2. The fluid pressure cylinder according to claim 1, further comprising
  an annular seal member provided between the piston member and the piston rod by being compressed, wherein
  the seal member is provided on an opposite side of the step portion with the first opening portion of the rod inner passage as a boundary.

3. The fluid pressure cylinder according to claim 2, wherein
  the piston member has:
  a piston main body portion configured to slide along an inner circumferential surface of the cylinder tube; and
  a ring member provided between the piston main body portion and the step portion of the piston rod, the ring member being configured to block the first opening portion of the rod inner passage, and
  the piston main body portion has an annular groove formed in an inner circumferential surface of the piston main body portion, the annular groove being formed so as to open at an end surface of the piston main body portion opposing to the step portion of the piston rod via the ring member, and the annular groove being configured to accommodate the seal member.

4. The fluid pressure cylinder according to claim 1, wherein
  the piston rod has a curved surface portion provided at a boundary portion between a small-diameter portion formed towards the tip end with respect to the step portion and the step portion of the small-diameter portion, the curved surface portion being recessed in a ring shape, and
  the piston member has a tapered portion provided on an inner circumferential surface of the piston member so as to face the curved surface portion, the tapered portion being formed such that an inner diameter is increased towards the one-side end surface.

* * * * *